United States Patent [19]

Egami et al.

[11] 4,089,214
[45] May 16, 1978

[54] INTAKE AIR AMOUNT DETECTING SYSTEM

[75] Inventors: Tsuneyuki Egami, Okazaki; Hisasi Kawai, Toyohashi; Tokio Kohama, Nishio; Hideki Obayashi, Aichi, all of Japan

[73] Assignee: Nippon Soken, Inc., Nishio, Japan

[21] Appl. No.: 809,041

[22] Filed: Jun. 22, 1977

[30] Foreign Application Priority Data

Jul. 5, 1976  Japan .................................. 51-79675

[51] Int. Cl.² .......................... G01M 15/00; G01F 1/68
[52] U.S. Cl. .......................................... 73/116; 73/204; 123/32 EJ
[58] Field of Search ............ 73/116, 204; 123/32 EA, 123/32 EJ

[56] References Cited

U.S. PATENT DOCUMENTS

| | | | |
|---|---|---|---|
| 2,972,885 | 2/1961 | Laub | 73/204 |
| 3,803,913 | 4/1974 | Tracer | 73/204 |
| 3,975,951 | 8/1976 | Kohama | 73/116 |
| 4,043,195 | 8/1977 | Hunting | 73/204 |

*Primary Examiner*—Herbert Goldstein

*Attorney, Agent, or Firm*—Cushman, Darby & Cushman

[57] ABSTRACT

An intake air amount detecting system includes a branch pipe disposed in the intake manifold of the engine and having two passages each provided therein with a temperature responsive resistor. One of the two passages is provided with an electric heater and a voltage is applied to the electric heater so that the temperature difference in the two passages measured by the two temperature responsive resistors is maintained at a predetermined value irrespective of the amount of air flow through the intake manifold. An A-D converter is further provided and includes a time constant circuit and a capacitor for producing across the capacitor a reference voltage which has a waveform representing a predetermined relationship between the voltage applied to the electric heater and the amount of intake air flow. The voltage actually applied to the heater is compared with the reference voltage at a voltage comparater in the A-D converter and the A-D converter produces a pulse signal having a time width corresponding to a period from the rise of the reference voltage until the reference voltage reaches the actual voltage, and hence corresponding to the amount of intake air flow.

10 Claims, 9 Drawing Figures

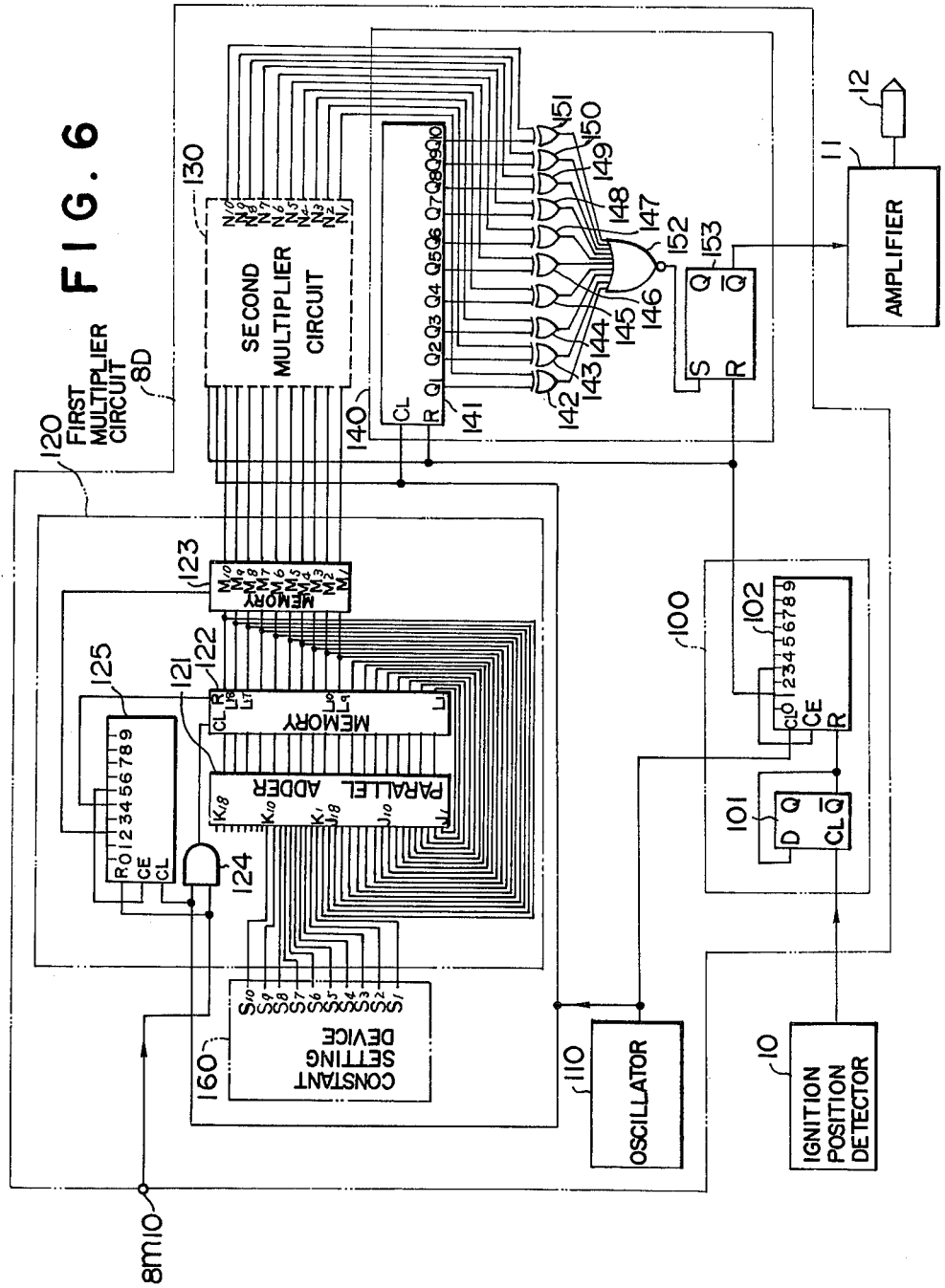

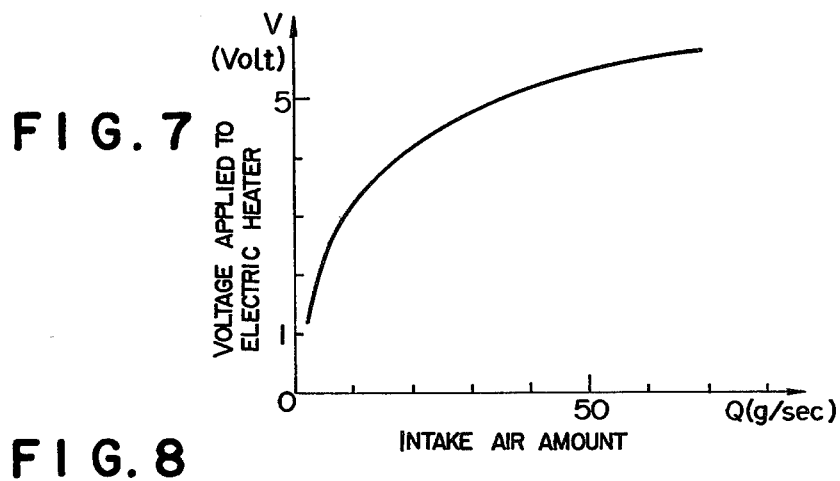
FIG. 7
FIG. 8
(A) 
(B) 
(C) 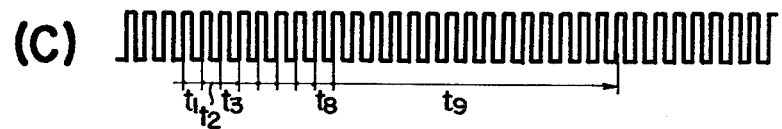
(D) 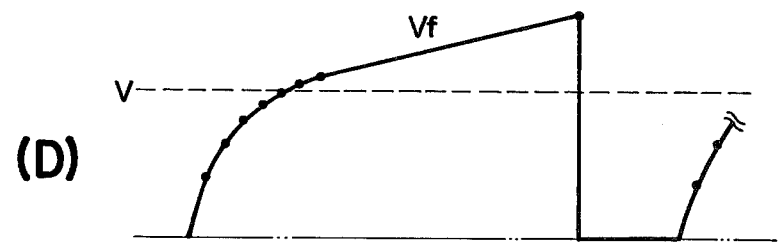
(E) 
(F) 
(G) 
TIME

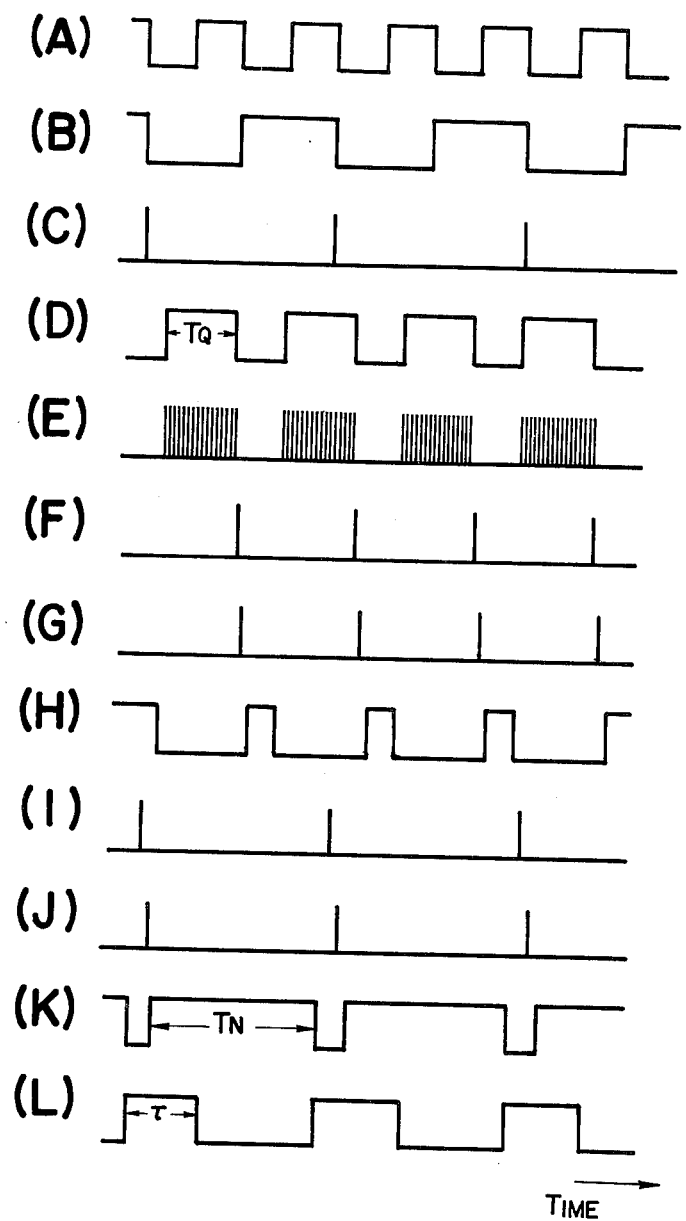

1

INTAKE AIR AMOUNT DETECTING SYSTEM

BACKGROUND OF THE INVENTION

1. Field of the Invention

The present invention relates to an intake air amount detecting apparatus for use with internal combustion engines of the type having an electronically controlled fuel metering system.

2. Description of the Prior Art

In the past, it has been confirmed that maintaining the air-fuel ratio of the mixture supplied to the engine at a certain ratio provides a very powerful means of purifying the exhaust gases discharged from the engine, and systems for detecting the amount of air drawn into the engine have been used in which the volume flow rate of intake air is indirectly detected in accordance with the engine rotational speed and the intake manifold vacuum or in accordance with the engine rotational speed and the throttle valve opening. The system of this type is disadvantageous in that since the amount of air drawn through the intake pipe is measured indirectly, the measurement error will be increased due to the effects of the changes in characteristics among engines of the same type caused during the manufacturing process, deterioration of the engine, unsatisfactorily adjusted clearance of the intake and exhaust valves of the engine, changes in performance of the air cleaner with time, etc., and moreover due to the fact that the intake air amount is measured in terms of volume flow rate, it is necessary to provide absolute pressure compensation thus making the system more complicate and expensive.

To overcome these deficiencies, a system has been proposed which includes a branch pipe disposed in the intake manifold of an engine and having two passages and first and second temperature responsive resistors disposed in the passages, and an electric heater disposed upstream of the temperature responsive resistor in one of the passages, whereby the voltage applied to the electric heater is controlled to maintain the temperature difference between the first and second temperature responsive resistors at a predetermined value and to thereby detect the amount of intake air in accordance with the applied voltage. One such system is described in U.S. Pat. No. 3,975,951, issued Aug. 24, 1976, to Kohama et al, and assigned to the same assignee of the present application. With this construction, however, the applied voltage has a complicate functional characteristic with respect to the intake air amount, and consequently if this applied voltage is utilized as a signal indicative of the intake air amount, it is necessary to apply a complicate correction to the calculation in accordance with the voltages of the resistors or the like.

SUMMARY OF THE INVENTION

It is an object of this invention to overcome the foregoing deficiencies of the prior art systems and to provide an intake air amount detecting system which uses and A-D converter for producing a pulse signal having a time width respresenting the amount of intake air.

The system of this invention has among its great advantages the fast that an A-D converter having a predetermined functional characteristic with respect to the input signal is used to convert the voltage applied to an electric heater into a pulse signal, thereby obtaining the desired signal indicative of the intake air amount only from the voltage applied to the electric heater without making any calculation correction.

Another great advantage of the system of this invention is that since the system includes two passages formed in the intake manifold of an engine, a temperature responsive resistor disposed in each of the passages and an electric heater disposed upstream of the temperature responsive resistor in one of the passages whereby the voltage applied to the electric heater is controlled to maintain the temperature difference between the temperature responsive resistors at a predetermined value and to thereby convert the applied voltage to a pulse signal having time width corresponding to a predetermined functional characteristic, by preliminarily setting the desired functional characteristc, it is possible to easily obtain a signal of the desired characteristic which is indicative of the intake air amount and to thereby detect the amount of the air drawn into the engine without any need for a complicate correction of the calculated value. Still another advantage is that the A-D converter which is used to convert the voltage applied to the electric heater to a pulse signal may comprise a plurality of resistors or capacitors each connected to the corresponding one of a plurality of separate analog switches so as to sequentially energize the analog switches, thus making it possible to selectively preset a variety of functional characteristics by properly adjusting the plurality of resistors or capacitors and to thereby always detect the amount of intake air in terms of the weight flow rate with ease and greater accuracy.

BRIEF DESCRIPTION OF THE DRAWINGS

FIG. 6 is a circuit diagram showing a detailed construction of the computing circuit shown in FIG. 1.

FIG. 7 is a characteristic diagram showing the relationship between the voltage V applied to the electric heater in the heater control circuit shown in FIG. 4 and the intake air amount Q.

FIG. 8 shows the signal waveforms generated at various points in the A-D converter shown in FIG. 5.

FIG. 9 shows the signal waveforms generated at various points in the computing circuit shown in FIG. 6.

DESCRIPTION OF THE PREFERRED EMBODIMENTS

Figure 1:
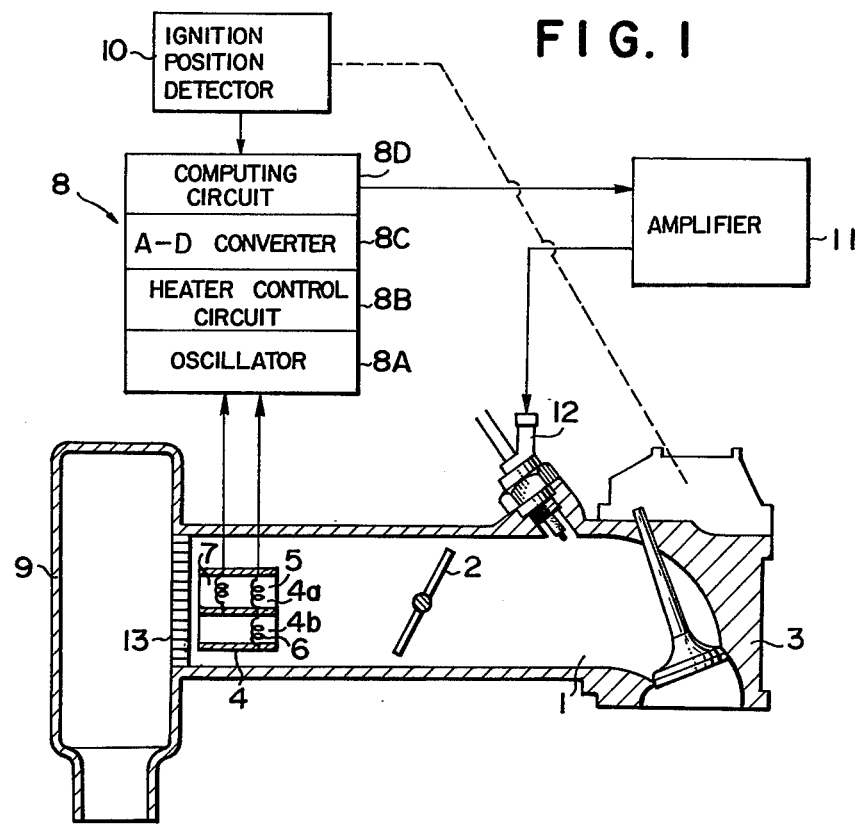
FIG. 1 is a schematic diagram showing the general construction of an embodiment of the present invention.

The present invention will now be described in greater detail with reference to the embodiment shown in the drawings.

Referring to FIG. 1, numeral 1 designates the intake manifold of an internal combustion engine 3, 2 a throttle valve mounted in the intake manifold 1, 4 a branch pipe disposed upstream of the throttle valve 2 in the intake manifold 1, the branch pipe 4 including two air passages 4a and 4b and being made from a heat insulating material such as glass wool. An electric heater 7 is disposed in the upstream portion of the air passage 4a, and also disposed in the air passage 4a downstream of and close to the electric heater 7 is a first temperature responsive resistor 5 adapted to function as a thermometer. A second temperature responsive resistor 6 is disposed in the air passage 4b to function as a thermometer. The temperature responsive resistors 5 and 6 are of the same characteristic, and in this embodiment they are made from the same material as the electric heater 7, i.e., a platinum resistance wire having a positive resistance-temperature characteristic. Numeral 13 designates a flow rectifying device formed into a honeycomb type tube for rectifying the air steam drown into the intake manifold 1, 9 a disturbance preventive container for preventing the intake air passing through the flow rectifying device 13 from being disturbed under the effect of the open air. Numeral 8 designates a control unit comprising an oscillator circuit 8A having a function of converting the d.c. voltage applied to the electric heater 7 to an amplitude-modulated oscillation signal and applying it to a bridge formed by the temperature responsive resistors 5 and 6 and two reference dividing resistors, a heater control circuit 8B for controlling the amount of heat generated by the electric heater 7, an A-D converter 8C for computing the amount of the intake air from the voltage applied to the electric heater 7 in the form of a duration signal having a given functional relation with the amount of intake air, and a computing circuit 8D for controlling the duration of fuel injection to the engine 3 in accordance with the output signal of the A-D converter 8C. Numeral 10 designates a known type of ignition position detector for generating a pulse output in synchronism with the rotation of the engine 3, 11 an amplifier for amplifying the output signal of the control unit 8, 12 an electromagnetic injection valve which is opened by the signal from the amplifier 11 to supply fuel to the engine 3.

Figure 2:
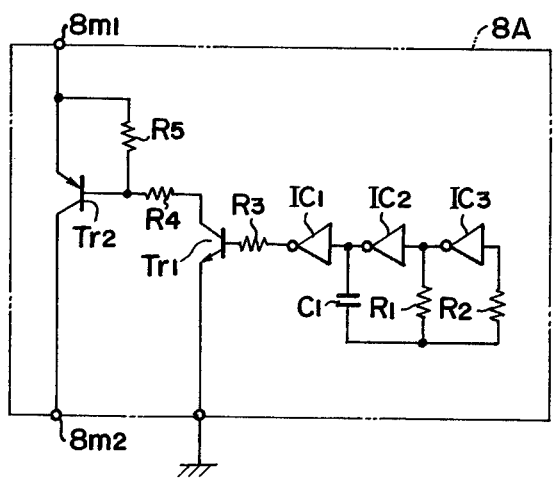
FIG. 2 is a circuit diagram showing a detailed construction of the oscillator circuit shown in FIG. 1.
Figure 3:
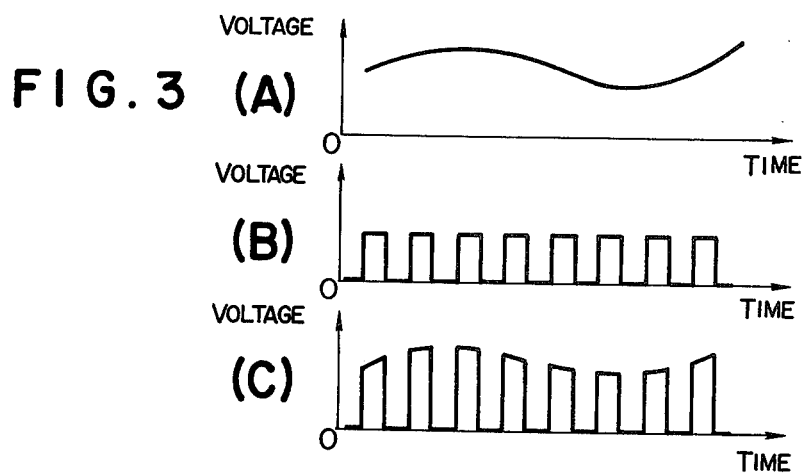
FIG. 3 shows the signal waveforms generated at various points in the oscillator circuit shown in FIG. 2.

As shown in FIG. 2, the oscillator circuit 8A of the control unit 8 is designed so that an oscillation signal of a constant frequency is produced by inverters $IC_2$ and $IC_3$, a capacitor $C_1$ and resistors $R_1$ and $R_2$, reshaped by an inverter $IC_1$ and then applied to the base of a transistor $T_{r1}$ through a resistor $R_3$. When the transistor $T_{r1}$ is turned on in response to this oscillation signal, current flows from a terminal $8_{m1}$ to resistors $R_4$ and $R_5$ and a transistor $T_{r2}$ is turned on. Consequently, when the transistors $T_{r1}$ and $T_{r2}$ are turned, the voltage applied to the input terminal $8_{m1}$ is generated at an output terminal $8_{m2}$ in the form of an on-off oscillation signal having a frequency equal to the oscillation signal and an amplitude equal to the voltage on the terminal $8_{m1}$. The waveforms of the signals respectively generated at the input terminal $8_{m1}$, the base of the transistor $T_{r1}$ and the output terminal $8_{m2}$ are respectively shown in (A), (B) and (C) of FIG. 3.

Figure 4:
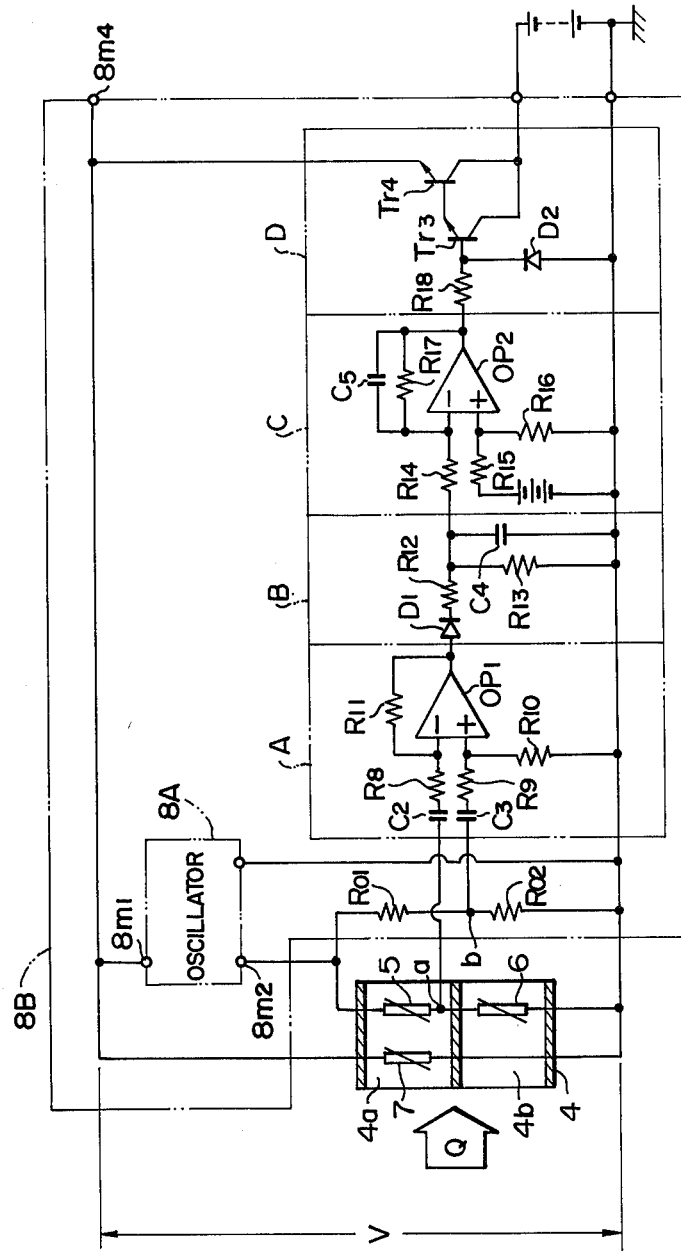
FIG. 4 is a circuit diagram showing a detailed construction of the a.c. amplification type heater control circuit shown in FIG. 1.

As shown in FIG. 4, the heater control circuit 8B of the control unit 8 comprises differential amplifiers, and the voltage V is applied to the electric heater 7 and the input terminal $8_{m1}$ of the oscillator circuit 8A. The d.c. voltage applied to the oscillator circuit 8A is generated in the form of the on-off output signal shown in (C) of FIG. 3 and applied through the terminal $8_{m2}$ to the bridge circuit comprising reference dividing resistors $R_{01}$ and $R_{02}$ and the temperature responsive resistors 5 and 6. Symbol A designates an a.c. differential amplifier circuit comprising input capacitors $C_2$ and $C_3$, input resistors $R_8$ and $R_9$, a resistor $R_{10}$, a feedback resistor $R_{11}$ and an operational amplifier $OP_1$ for amplifying the potential difference between a junction point a of the temperature responsive resistors 5 and 6 and a junction point b of the reference dividing resistors $R_{01}$ and $R_{02}$.

Symbol B designates a rectifier circuit comprising a diode $D_1$, resistors $R_{12}$ and $R_{13}$ and a capacitor $C_4$, whereby the a.c. output of the a.c. differential amplifier circuit A is half-wave rectified and converted into a d.c. voltage. Symbol C designates an integrating differential an integrating differential amplifier circuit comprising input resistors $R_{14}$ and $R_{15}$, a resistor $R_{16}$, a feedback resistor $R_{17}$, an integrating capacitor $C_5$ and an operational amplifier $OP_2$, whereby the difference between the output voltage of the rectifier circuit B and the reference voltage is subjected to integration and differential amplification and the resulting output is applied to the electric heater 7 and the oscillator circuit 8A through an amplifier circuit D comprising a resistor $R_{18}$, a diode $D_2$ and transistors $T_{r3}$ and $T_{r4}$. Numeral $8_{m4}$ designates the output terminal of the heater control circuit 8B.

Figure 5:
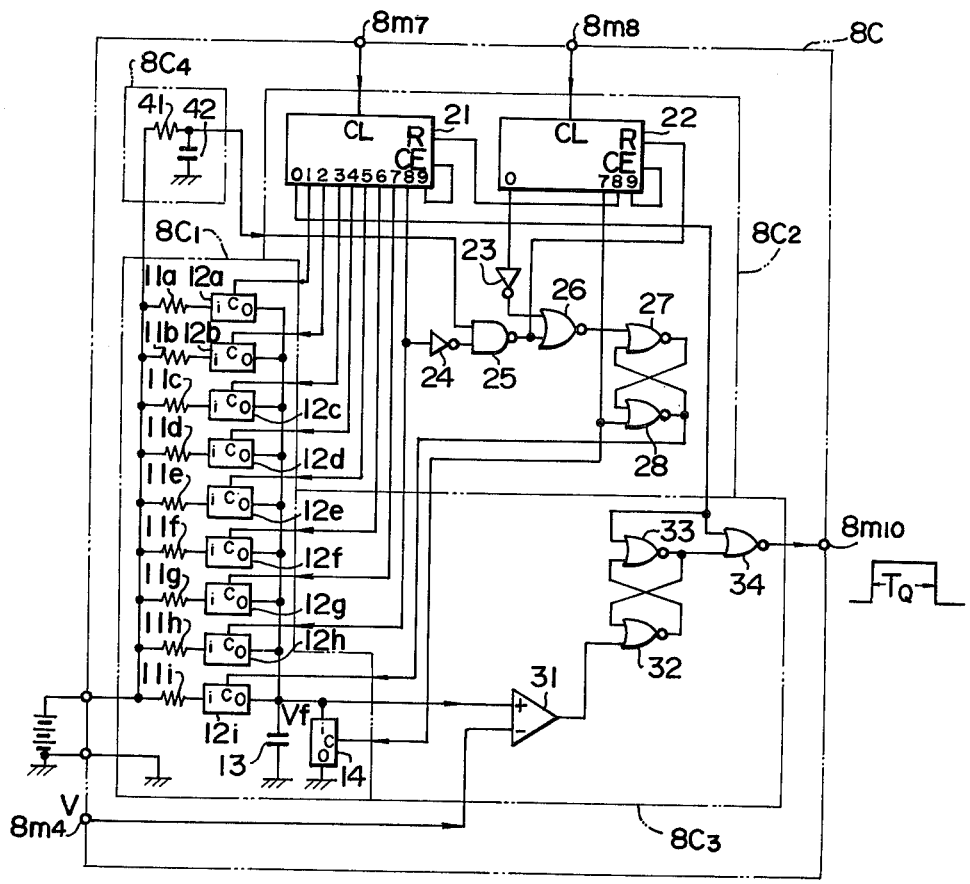
FIG. 5 is a circuit diagram showing a detailed construction of the A-D converter shown in FIG. 1.

As shown in FIG. 5, the A-D converter 8C of the control unit 8 comprises a time constant circuit $8C_1$, a time constant selection circuit $8C_2$, a voltage comparison circuit $8C_3$ and a reset circuit $8C_4$ operable in response to the closing of the power circuit (not shown). The time constant circuit $8C_1$ comprises nine resistors 11a, 11b, 11c, 11d, 11e, 11f, 11g, 11h and 11i, nine analog switches 12a, 12b, 12c, 12d, 12e, 12f, 12g, 12h and 12i each connected in series with the corresponding one of the resistors, a capacitor 13 wired-OR connected to the analog switches, and an analog switch 14 connected across the capacitor 13. The resistors 11a to 11i have respective resistance R to 9R, whereas the capacitor 13 has a constant capacitance C. The time constant selection circuit $8C_2$ comprises decade dividers/counters 21 and 22 (RCA ICCD 4017) for respectively receiving and counting the clock pulses of a constant frequency which are applied to input terminals $8_{m7}$ and $8_{m8}$, and inverter 24 connected to the 8th output of the decade divider/counter 21, a NAND gage 25, an inverter 23 connected to the 0th output of the decade divider/counter 22, a NOR gate 26 connected to the outputs of the NAND gate 25 and the inverter 23, and NOR gates 27 and 28 constituting an R-S flip-flop, and the 1st to 8th outputs of the decade devider/counter 21, the output of the NOR gate 28 and the 7th output of the decade divider/counter 22 are respectively connected to the control terminals C of the analog switches 12a to 12i and 14 in the time constant circuit $8C_1$. The voltage comparison circuit $8C_3$ comprises an analog voltage comparator 31 for receiving at its noninverting input the function waveform voltage developed across the capacitor 13 by the time constant circuit $8C_1$ and the time constant selection circuit $8C_2$ and at its inverting input the voltage V applied through the terminal $8_{m4}$, NOR gates 32, 33 constituting an R-S flip-flop and a NOR gate 34. The reset circuit $8C_4$ which is operable upon closing of the power circuit comprises a resistor 41 and a capacitor 42, whereby after the power circuit has been closed, a low level signal is generated for the duration of the RC time constant determined by the resistor 41 and the capacitor 42. The reset circuit $8C_4$ is connected to the NAND gate 25 in the time constant selection circuit $8C_2$. Numeral $8_{m10}$ designates the output terminal of the A-D converter 8C.

As shown in FIG. 6, the computing circuit 8D of the control unit 8 comprises an injection timing trigger signal generating circuit 100 including a D-type flip-flop 101 (RCA ICCD 4013) for receiving the ignition position signal generated from the known ignition position detector 10 and a decade divider/counter 102

(RCA ICCD 4017), an oscillator circuit 110 whose detailed construction is not shown but includes a known type of quartz crystal oscillator for generating clock signals of a constant frequency, a first multiplier circuit 120 including a parallel adder 121 (RCA ICCD4008), memories 122 and 123 (RCA ICCD4035), an AND gate 124 and a decade divider/counter 125, a second multiplier circuit 130 which is identical in construction with the first multiplier circuit 120 and thus is not shown in any detail, a converter 140 including a binary counter 141, ten EXCLUSIVE-OR gates 142, 143, 144, 145, 146, 147, 148, 149, 150 and 151, a 10-input NOR gate 152 and an R-S flip-flop 153 and adapted to convert the binary code output of the second multiplier circuit 130 to a pulse signal, and a constant setting device 160 which is not shown in detail but including switches.

With the construction described above, the operation of the system of this invention will now be described with the aid of FIGS. 7 to 9. In FIG. 1, air is drawn into the engine 3 through the disturbance preventive device 9 and through the intake manifold 1 in an amount determined by the opening of the throttle valve 2. The air drawn into the intake manifold 1 is rectified by the flow rectifying device 13 in the form of a honeycomb tube, and consequently a certain proportion of the total amount of the intake air is always introduced into the branch pipe 4 having the passages 4a and 4b. In the one passage 4a of the branch pipe 4, the temperature of the air passing therethrough is increased by a certain amount $\Delta T$ by the heat generation of the electric heater 7 and the air is then drawn into the engine 3 through the temperature responsive resistor 5. In the other passage 4b, the air is drawn into the engine 3 through the temperature responsive resistor 6. Consequently, the temperature difference $\Delta T$ caused by the electric heater 7 and related to the amount of the intake air appears as a difference in resistance value between the temperature responsive resistors 5 and 6. Thus, the d.c. voltage V applied to the electric heater 7 and the oscillator circuit 8A or the amount of heat generation by the electric heater 7 is controlled by the heater control circuit 8B in such a manner that the temperature difference $\Delta T$ between the passages 4a and 4b is maintained at a predetermined value. For instance, in FIG. 4, as the intake air amount Q increases, the temperature difference $\Delta T$ decreases thus decreasing the potential difference between the junction point a of the temperature responsive resistors 5 and 6 and the junction point b of the reference dividing resistors $R_{01}$ and $R_{02}$ in the bridge circuit. Consequently, the output peak value of the a.c. differential amplifier circuit A decreases and the rectified output signal of the rectifier circuit B decreases. Thus, the difference between the rectified output signal and the reference voltage increases, and the output of the integrating differential amplifier circuit C increases, thus increasing the voltage V applied to the electric heater 7 and the input terminal $8_{m1}$ of the oscillator circuit 8A through the amplifier circuit D. As a result, the amount of the heat generated by the electric heater 7 increases, and the temperature difference $\Delta T$ between the passages increases. On the contrary, when the intake air amount Q decreases, the temperature difference $\Delta T$ increases, and the potential difference between the junction points a and b in the bridge circuit increases. Consequently, the output peak value of the a.c. differential amplifier circuit A is increased, with the result that the output voltage of the rectifier circuit B is increased and applied to the integrating differential amplifier circuit C. Thus, the potential difference between the output of the rectifier circuit B and the reference voltage is decreased and the output of the integrating differential amplifier circuit C is decreased, thus decreasing the voltage V applied to the electric heater 7 and the input terminal $8_{m1}$ of the oscillator circuit 8A through the amplifier circuit D. As a result, the ajount of the heat generated by the electric heater 7 is decreased and the temperature difference $\Delta T$ between the passages 4a and 4b is decreased. The heater control circuit 8B controls the voltage V applied to the electric heater 7 and the oscillator circuit 8A in such a manner that the electric heater 7 generates heat in accordance with the intake air amount Q, and the temperature difference $\Delta T$ between the temperature responsive resistors 5 and 6 is always maintained constant. While the voltage V increases in proportion to an increase in the intake air amount Q, it has been confirmed experimentally that the relationship between the voltage V and the intake air amount Q to the engine 3 is approximately a logarithmic functional relationship and not a directly proportional relationship as shown in FIG. 7.

On the other hand, in FIG. 5 the reset circuit $8C_4$ generates a low level reset signal in response to the closing of the power circuit. This reset signal is inverted and applied to the reset terminal R of the decade divider/counter 22 through the NAND gate 25, so that the decade divider/counter 22 is reset and all of its outputs go to a low level (hereinafter simply designated by a logical symbol "0"). After the resetting has been released, the decade divider/counter 22 counts the clock signals shown in (A) of FIG. 8 and applied to the terminal $8_{m8}$ and the resulting count values are successively delivered to its 0th to 9th output terminals. Thus, when the 8th output of the decade divider/counter 22 goes to a high level (hereinafter simply designated by a logical symbol "1"), the reset signal shown in (B) of FIG. 8 is applied to the reset terminal R of the decade divider/counter 21 thus resetting it. When this occurs, all of the control terminals C of the analog switches 12a to 12i in the time constant circuit $8C_1$ go to "0" and the analog switches 12a to 12i are turned off. When the resetting of the decade divider/counter 21 has been released, the decade divider/counter 21 counts the clock signals shown in (C) of FIG. 8 and applied to the terminal $8_{m7}$ and the resulting count values are successively delivered to its 0th to 9th output terminals. The 1st to 8th outputs of the decade divider/counter 21 are respectively connected to the control terminals C of the analog switches 12a to 12h, and consequently the analog switches 12a to 12h are successively turned on at intervals of one period of the clock signals applied to the terminal $8_{m7}$. More specifically, the analog switch 12a is turned on for the duration of a time $t_1$ in (C) of FIG. 8, so that a changing current flows to the capacitor 13 through the resistor 11a having the resistance R and a voltage $V_f$ across the capacitor 13 having the capacitance C increases according to a function $V_f = V_c(1 - \exp(-t/RC))$. During a time $t_2$ following the time $t_1$, the analog switch 12b is turned on and changing current flows through the resistor 11b having the resistance 2R to the capacitor 13 thus changing it further with the time constant 2RC. The similar operation is performed repeatedly with the time constant proportionally increased until the analog switch 12h is turned on, and the capacitor 13 is charged to the voltage shown in (D) of FIG. 8. Since the time constant is proportionally increased from RC to 8RC, the voltage across the capacitor 13 has a logarithmic functional relation with the time. When the 8th output of the decade divider/counter 21 goes to "1", the decade divider/counter 22 is reset by this signal through the inverter 24 and the NAND gate 25, and after the release of the resetting the decade divider/counter 22 counts the clock signals shown in (A) of FIG. 8 in the previously mentioned manner. On the other hand, the R-S flip-flop comprising the NOR gates 27 and 28 is set in response to the negative-going transition of the signal at the 8th output of the decade divider/counter 21 and is reset in response to the positive-going transition of the signal at the 7th output of the decade divider/counter 22, thereby causing the output signal of the NOR gate 28 goes to "1" for the duration of a time $t_9$ shown in (C) of FIG. 8. This signal is applied to the control terminal C of the analog switch 12$i$, so that the analog switch 12$i$ is turned on for the duration of the time $t_9$ after the time $t_8$, and changing current flows through the resistor 11$i$ having the resistance 9R to the capacitor 13, thus further increasing its output voltage $V_f$ with the time constant 9RC as shown in (D) of FIG. 8. When the 7th output terminal of the decade divider/counter 22 goes to "1" so that the analog switch 14 is turned on, the charge stored in the capacitor 13 is discharged, and the voltage $V_f$ across the terminals of the capacitor 13 is instantly dropped to zero volt. Thereafter, when the 8th output of the decade divider/counter 22 goes to "1", the decade divider/counter 21 is reset by this signal and the control terminals C of the analog switches 12$a$ to 12$i$ and 14 are changed to "0". Thereafter, the similar operation mentioned previously is repeated.

It is evident that the rate of change of the logarithmic function voltage $V_f$ across the capacitor 13 is determined by the resistance values of the resistors 11$a$ to 11$i$, respectively, and in this embodiment it is so designed that the change of the voltage $V_f$ with time approximately corresponds to the change of the voltage V with the intake air amount Q shown in FIG. 7. The voltage $V_f$ across the capacitor 13 is applied to the noninverting input of the analog voltage comparator 31 in the voltage comparison circuit $8C_3$ and the voltage V shown in FIG. 7 and related to the amount Q of intake air is applied to the inverting input of the analog voltage comparator 31, with the result that the output signal of the analog voltage comparator 31 goes to "1" as shown in (E) of FIG. 8 when $V_f > $ V. In the voltage comparison circuit $8C_3$, the R-S flip-flop comprising the NOR gates 32 and 33 is set by the 0th output signal of the decade/divider/counter 21 shown in (F) of FIG. 8 and is reset by the output signal of the voltage comparator 31, with the result that a pulse signal having a time width $T_Q$ proportional to the intake air amount Q is generated at the output terminal 8$m_{10}$ as shown in (G) of FIG. 8.

This pulse signal is applied, as a signal indicative of the intake air amount Q, to the computing circuit 8D shown in FIG. 6 through the terminal 8$m_{10}$. In the Figure, the injection timing trigger signal generating circuit 100 is designed so that the ignition position signal produced by the known ignition position detector 10 and shown in (A) of FIG. 9 is subjected to ½ frequency division by the D-type flip-flop 101, and the decade divider/counter 102 generates the injection trigger signal shown in (C) of FIG. 9 in synchronism with the negative-going transition of the Q output signal of the D-type flip-flop 101 shown in (B) of FIG. 9. The decade divider/counter 102 is so designed that each time three clock pulses are applied from the oscillator circuit 110, the counting of further clock pulses is inhibited. In the first multiplier circuit 120, binary code output signals $S_{10}, S_9, \ldots, \ldots, S_1$ each consisting of an arbitrarily selected "1" or "0" signal are applied from the constant setting device 160 to input terminals $K_{10}, K_9, \ldots, K_1$ of the adder 121, and outputs $L_{18}, L_{17}, \ldots, \ldots, L_1$ of the memory 122 are applied to the other input terminals $J_{18}, J_{17}, \ldots, \ldots, J_1$ of the adder 121. The decade divider/counter 125 is designed so that each time six clock pulses are applied, the counting of further clock pulses is inhibited. During the time that the output of the A-D converter 8C or the pulse signal of the time width $T_Q$ shown in (D) of FIG. 9 is applied to the terminal 8$m_{10}$, n clock pulses from the oscillator circuit 110 are passed to the output terminal of the AND gate 124 in proportion to the time width $T_Q$ as shown in (E) of FIG. 9. After the time width $T_Q$, the decade divider/counter 125 counts clock pulses up to six so that when the counter 125 counts the second, fourth and sixth clock pulses, a "1" signal is generated at the second, fourth and sixth terminals of the counter 125 as shown in (F), (G) and (H) of FIG. 9. When the counter 125 counts the fourth clock pulse, the memory 122 is reset and its outputs $L_{18}, L_{17}, \ldots,$ and $L_1$ are all reset to "0". Thereafter, in response to the clock pulses shown in (E) of FIG. 9, the memory 122 generates from its outputs $L_{18}, L_{17}, \ldots$, and $L_1$ output binary codes $S_{10}, \ldots, S_1, 2 \times (S_{10}, \ldots, S_1), \ldots,$ and $n \times (S_{10}, \ldots, S_1)$, respectively, and the memory 123 stores the higher 10 digits of the output $n \times (S_{10}, \ldots, S_1)$ as $M_{10}, \ldots, M_1$ in response to the second clock pulse shown in (G) of FIG. 9. Here, since the number of clock pulses $n$ is a value proportional to the intake air amount R as mentioned previously and the signals $S_{10}, \ldots, S_1$ represents the binary code of a preset constant K, the first multiplier circuit 120 has performed a multiplication $C \times K \times Q$ (where C is a proportionality constant and it is hereinafter included in the present constant K).

While the first multiplier circuit 120 is connected to the oscillator circuit 110, the constant setting device 160 and the A-D converter 8C through the terminal 8$m_{10}$, the second multiplier circuit 130 which is identical in construction with the first multiplier circuit 120 is connected to the injection timing trigger signal generating circuit 100, the oscillator circuit 110 and the first multiplier circuit 120. The output signal of the injection timing trigger signal generating circuit 100 shown in (C) of FIG. 9 is applied to the second multiplier circuit 130 and a pulse signal of the time width $T_N$ shown in (K) of FIG. 9 is generated. Here, it is evident that the time width $T_N$ is proportional to the reciprocal of the number of engine revolutions N, and consequently $n'$ clock pulses from the oscillator circuit 110 are applied during the time width $T_N$, so that the second multiplier circuit 130 adds up the output $M_{10}, \ldots, M_1$ of the first multiplier circuit 120 $n'$ times and generates an output $n' \times (M_{10}, \ldots, M_1)$ at its outputs $N_{10}, \ldots N_1$. Consequently, the second multiplier circuit 130 performs a multiplication $K \times Q/N$. The converter circuit 140 is a circuit which converts the binary code output $N_{10}, \ldots, N_1$ of the second multiplier circuit 130 to a pulse signal having a time width $\tau$, and the binary counter 141 and the R-S flip-flop 153 are reset by the output signal of the injection timing trigger signal generating circuit 100 shown in (C) of FIG. 9. After the binary counter 141 has been reset, the binary counter 141 counts the clock pulses from the oscillator circuit 100 and generates its count value as an output $Q_{10}, \ldots, Q_1$. When the output $Q_{10}, \ldots, Q_1$ of the binary counter 141 agrees with the output $N_{10}, \ldots, N_1$ of the second multiplier circuit 130, all of the EXCLUSIVE-OR gates generate "0", and consequently the NOR gate 152 sets the R-S flip-flop 153. As a result, the R-S flip-flop 153 generates at its Q output the "1" signal shown in (L) of FIG. 9 from the instant that it is reset until it is set, and the time width $\tau$ of the signal is proportional to the output $N_{10}, \ldots, N_1$ of the second multiplier circuit 130. Namely, the time width $\tau$ during which the Q output of the R-S flip-flop 153 remains at "1" represents the value $K \times Q/N$. This time width is proportional to the intake air amount Q and inversely proportional to the number of engine revolutions N, and the signal is amplified by the power amplifier 11 and applied to the electromagnetic injection valve 12, thus opening the valve 12 and supplying fuel to the engine 3.

In the above-described embodiment, the construction of the computing circuit 8D is for illustrative purposes only, and an analog computing method may be used as the method of computing the time width $\tau$ of pulse signal which determines the duration of opening of the injection valve 12. Further, while the resistors in the time constant circuit $8C_1$ are adjusted in such a manner that the output time width $T_Q$ of the A-D converter 8C becomes directly proportional to the intake air amount Q, if necessary, the resistors may be adjusted so that any one of various functional relationship, such as, logarithmic functional relation, hyperbolic functional relationship, etc., exists between the time width $T_Q$ and the intake air amount Q.

What is claimed is:

1. An intake air amount detecting system for internal combustion engine comprising:
    an electric heater, positioned in the intake passage of an engine, for heating a part of the intake air flowing through said intake passage in accordance with a first voltage supplied thereto;
    a first temperature sensor, positioned in said intake passage of said engine, for generating a first output signal corresponding to the temperature of said a part of the intake air heated by said electric heater;
    a second temperature sensor, positioned in said intake passage of said engine, for generating a second output signal corresponding to the temperature of the other part of the intake air;
    a heater control circuit, connected to said first and second temperature sensors, for controlling said first voltage supplied to said electric heater in response to said first and second output signals so that the temperature difference between said part and the other part of the intake air is kept constant, said voltage increasing as the amount of the intake air increases;
    a time constant circuit including a capacitor adapted to be charged at a varying charging ratio to generate a second voltage which increases as the charging time increases; and
    a comparison circuit, connected to receive said first and second voltages, for comparing the former with the latter to generate a pulse signal having a time width which increases as said first voltage increases, whereby said time width is in a proportional relationship with the amount of the intake air.

2. An intake air amount detecting system according to claim 1, wherein said time constant circuit includes:
    a plurality of resistors having different resistance values from each other; and
    a plurality of switches for electrically connecting and disconnecting said resistors with said capacitor to change said charging ratio of said capacitor.

3. An intake air amount detecting system according to claim 2 further comprising:
    a time constant selection circuit, connected to said time constant circuit, for selecting at least one of said switches at each first constant interval so that said charging ratio of said capacitor is varied at said each first constant interval.

4. An intake air amount detecting system according to claim 3, wherein said time constant selection circuit includes:
    a first signal generator for generating a first signal at said each first constant interval so that said charging ratio of said capacitor is varied; and
    a second signal generator for generating a second signal at each second constant interval in response to which said capacitor is discharged and charged again, said second constant interval being predetermined so that said first signal is generated plural times therein.

5. An intake air amount detecting system according to claim 1, wherein said first temperature sensor includes a first temperature responsive resistor across which said first output signal is generated, and wherein said second temperature sensor includes a second temperature responsive resistor which is connected in series with said first temperature responsive resistor and across which said second output signal is generated.

6. An intake air amount detecting system according to claim 5 further comprising:
    a series-connected reference resistors connected in parallel with said series-connected first and second temperature responsive resistors to constitute a bridge circuit therewith; and
    an oscillator, connected to said bridge circuit, for supplying said bridge circuit with an alternating current voltage the amplitude of which is proportional to that of said first voltage supplied to said electric heater.

7. An intake air amount detecting system according to claim 6, wherein said heater control circuit includes:
    an alternating current differential amplifier, connected to said bridge circuit, for generating an alternating current voltage which is proportional to the voltage difference between two junctions of said series-connected temperature responsive resistors and said series-connected reference resistors;
    a rectifier circuit, connected to said differential amplifier, for rectifying said alternating current voltage; and
    an integration circuit, connected to said rectifier circuit, for integrating the output voltage of said rectifier circuit to generate said first voltage which is supplied to said electric heater and said oscillator.

8. An intake air amount detecting system according to claim 7, wherein said time constant circuit includes:
    a plurality of resistors having different resistance values from each other; and
    a plurality of switches for electrically connecting and disconnecting said resistors with said capacitor to change said charging ratio of said capacitor.

9. An intake air amount detecting system according to claim 8 further comprising:

a time constant selection circuit, connected to said time constant circuit, for selecting at least one of said switches at each first constant interval so that said charging ratio of said capacitor is varied at said each first constant interval.

10. An intake air amount detecting system according to claim 9, wherein said time constant selection circuit includes:

a first signal generator for generating a first signal at said each first constant interval so that said charging ratio of said capacitor is varied; and a second signal generator for generating a second signal at each second constant interval in response to which said capacitor is discharged and charged again, said second constant interval being predetermined so that said first signal is generated plural times therein.

* * * * *